US008967595B2

(12) United States Patent
Chou

(10) Patent No.: US 8,967,595 B2
(45) Date of Patent: Mar. 3, 2015

(54) RATCHET ADAPTER FOR STRAP TENSIONER

(71) Applicant: Yeh-Chien Chou, Taoyuan County (TW)

(72) Inventor: Yeh-Chien Chou, Taoyuan County (TW)

(73) Assignee: Strong Yun Industrial Co., Ltd., Taoyuan (TW)

( * ) Notice: Subject to any disclaimer, the term of this patent is extended or adjusted under 35 U.S.C. 154(b) by 99 days.

(21) Appl. No.: 13/913,545

(22) Filed: Jun. 10, 2013

(65) Prior Publication Data

US 2014/0360294 A1    Dec. 11, 2014

(51) Int. Cl.
*B65H 77/00* (2006.01)
*F16H 19/08* (2006.01)

(52) U.S. Cl.
CPC ..................................... *F16H 19/08* (2013.01)
USPC ................. 254/223; 24/68 CD; 74/88; 81/60; 254/217; 254/239

(58) Field of Classification Search
USPC .................... 74/88; 24/68 CD, 69 CT; 81/60; 254/100, 105, 112, 217, 218, 222, 223, 254/239, 240, 247
See application file for complete search history.

(56) References Cited

U.S. PATENT DOCUMENTS

| 444,843 | A | * | 1/1891 | Mohland | 254/223 |
| 2,222,162 | A | * | 11/1940 | Adamson | 254/217 |
| 2007/0221897 | A1 | * | 9/2007 | Cardona | 254/218 |
| 2010/0123109 | A1 | * | 5/2010 | Lu | 254/110 |
| 2011/0233491 | A1 | * | 9/2011 | Chou | 254/106 |

* cited by examiner

*Primary Examiner* — William Gilbert

(57) ABSTRACT

An adapter for coupling a lever to continuously unidirectionally drive a strap fastener is disclosed. The adapter includes a U-shaped frame with two free ends and a junction. The two free ends are separately provided with two shaft holes. Two sliding slots are separately formed near the shaft holes. A lever hole is formed at the junction. A ratchet shaft has an outer section with a radial hole and an inner section inserted in the shaft holes. A bolt is inserted into the radial hole. A ratchet is mounted around the ratchet shaft. A pawl is slidably disposed between the two sliding slots for engaging with the ratchet. A spring stopper is fixed between two sides of the frame. A spring is compressively arranged between the pawl and spring stopper. A holed plate is fixed between the spring stopper and the junction.

8 Claims, 8 Drawing Sheets

RATCHET ADAPTER FOR STRAP TENSIONER

BACKGROUND OF THE INVENTION

1. Technical Field The invention relates to strap tensioners for cargo loaded on trucks, particularly to adapters for strap tensioners.

2. Related Art

Please refer to FIGS. 7 and 8. A strap tensioner 20 is used on a truck to tie cargo loaded on a deck of the truck. One end of a strap 40 is fixed at the truck, and the other end thereof passes through a slot 210 of a winding shaft 21. A lever 30 is inserted in a lever hole 220 of a protrudent portion 22 of the winding shaft 21. Rotating the lever 30 to wind the strap 40 on the winding shaft 21 can tense up the strap 40.

The winding shaft 21 is provided with a ratchet and a pawl to avoid reverse rotation. Due to the spatial limitation, the lever 30 must be repeatedly drawn out from one of the lever holes 220 and inserted into another one when rotating the lever 30 to an angle. The ratchet and pawl can temporarily hold the position of the winding shaft 21. However, repeatedly drawing and inserting the lever 30 is very troublesome and uneconomic.

SUMMARY OF THE INVENTION

An object of the invention is to provide a ratchet adapter to link a lever to a strap tensioner, which can reciprocatingly unidirectionally drive the winding shaft without drawing the lever.

To accomplish the above object, the adapter includes a U-shaped frame with two free ends and a junction. The two free ends are separately provided with two shaft holes. Two sliding slots are separately formed near the shaft holes. A lever hole is formed at the junction. A ratchet shaft has an outer section with a radial hole and an inner section inserted in the shaft holes. A bolt is inserted into the radial hole. A ratchet is mounted around the ratchet shaft. A pawl is slidably disposed between the two sliding slots for engaging with the ratchet. A spring stopper is fixed between two sides of the frame. A spring is compressively arranged between the pawl and spring stopper. A holed plate is fixed between the spring stopper and the junction.

DETAILED DESCRIPTION OF THE INVENTION

Figure 1:
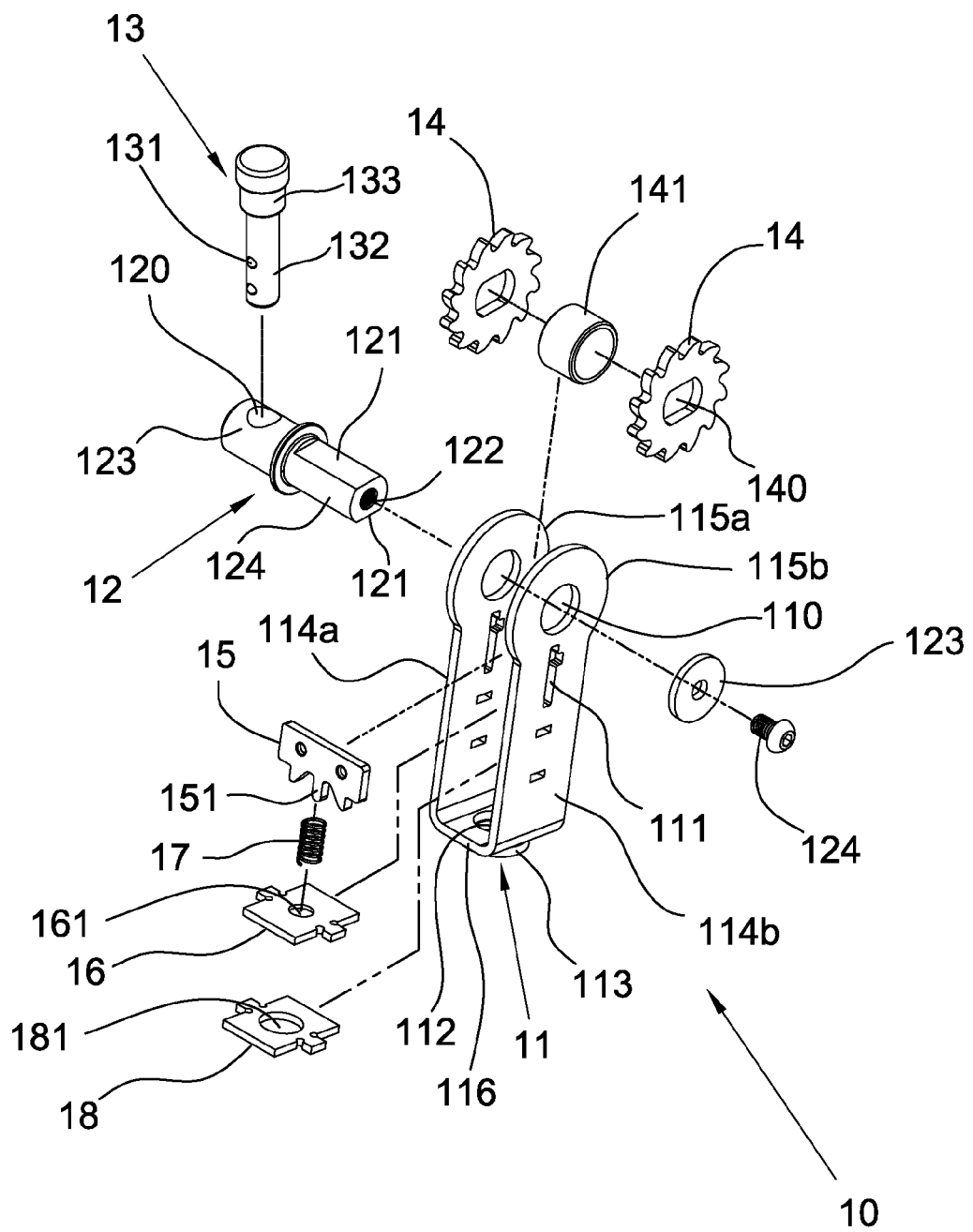
FIG. 1 is an exploded view of the invention.
Figure 2:
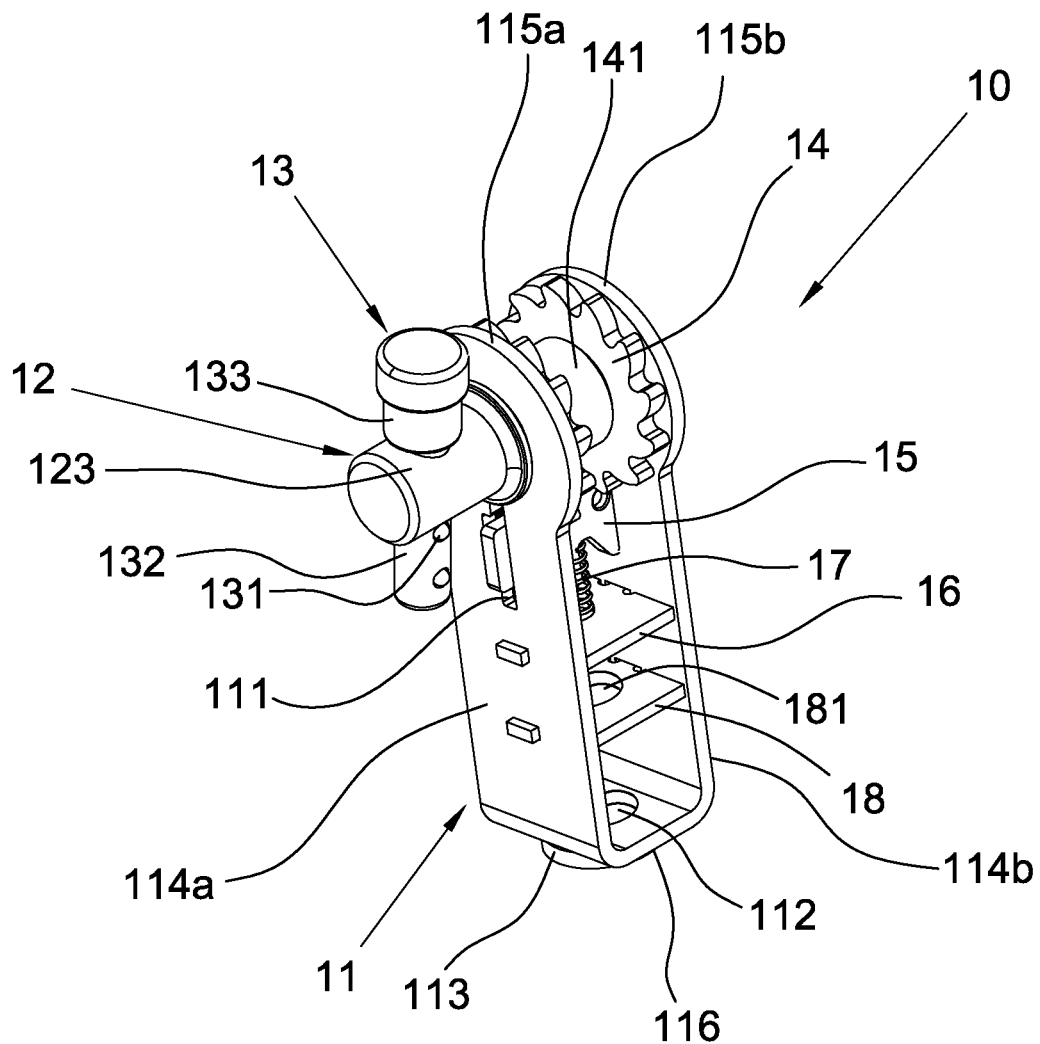
FIG. 2 is a perspective view of the invention.
Figure 3:
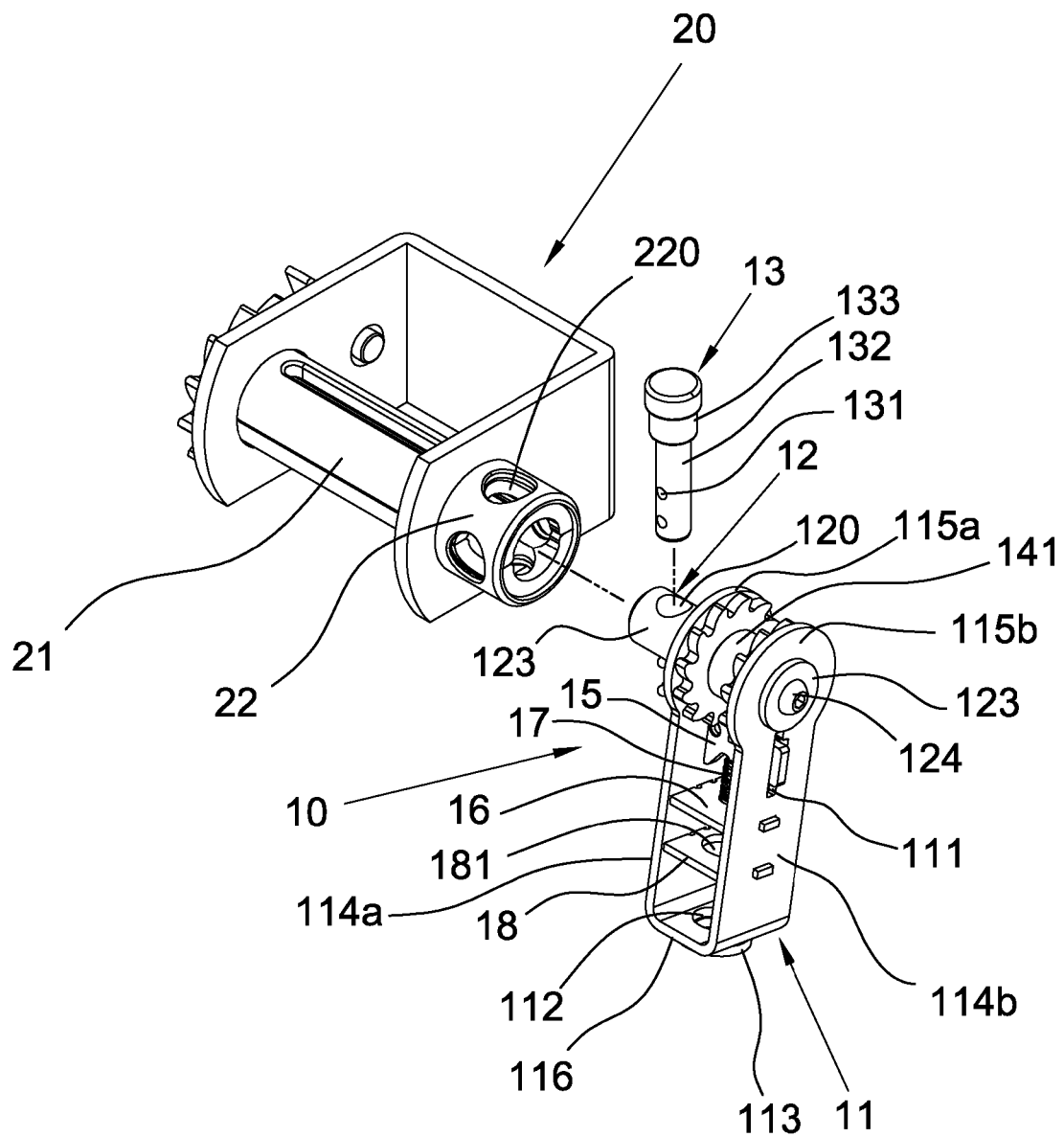
FIG. 3 is a schematic view of the invention and a strap tensioner.

Please refer to FIGS. 1-3. The ratchet adapter 10 of the invention includes a frame 11, a ratchet shaft 12, a bolt 13, a ratchet 14, a pawl 15, a spring stopper 16, a spring 17 and a holed plate 18. The frame 11 is of a U-shaped body composed of a junction 116 and two sides 114a, 114b with two free ends 115a, 115b. The two free ends 115a, 115b are separately provided with two shaft holes 110. Two sliding slots are separately formed in the two sides 114a, 114b near the shaft holes 110. A lever hole 112 is formed at the junction 116. The outside edge of the lever hole 112 is further formed with a reinforcement wall 113.

The ratchet shaft 12 has an outer section 123 with a radial hole 120 and an inner section 124 axially inserted in the shaft holes 110. The outer section 123 is used for coupling a protrudent portion 22 of a winding shaft 21 of a strap tensioner 20. The radial hole 120 is aligned with a through hole 220 of the protrudent portion 22 to be inserted by the bolt 13. The inner section 124 is formed with two parallel planes 121. And an outer end of the inner section 124 is axially disposed with a central threaded hole 122. The ratchet shaft 12 can be fastened on one of the sides 114a, 114b by screwing a screw 124 and a washer 125 into the central threaded hole 122.

The bolt 13 is composed of a bar 132 and a head 133 whose diameter is larger than that of the bar 132. The bar 132 is inserted into the radial hole 120 and the through hole 220 of the protrudent portion 22 so that the ratchet shaft 12 is firmly coupled to the winding shaft 21. Preferably, the bar 132 is provided with at least one retractable ball 131. The retractable ball 131 and the head 133 can prevent the bolt 13 from escaping.

The ratchet 14 is integratedly mounted around the ratchet shaft 12 to rotate with the ratchet shaft 12. In this embodiment, the number of the ratchet 14 is two and the two ratchets 14 are separately located outside the two sides 114a, 114b. A sleeve 141 is sandwiched between the two sides 114a, 114b and the two ratchets 14. Each of the ratchets 14 is formed with a central hole 140 having a shape corresponding to the inner section 124 of the ratchet shaft 12.

The pawl 15 is a plate slidably disposed between the two sliding slots 111 of the frame 11 for engaging with the ratchets 14. The pawl has a tongue 151 toward the junction 116.

The spring stopper 16 is fixed between two sides 114a, 114b of the frame 11 and is formed with a central recess 161 toward the tongue 151.

The spring 17 is compressively arranged between the tongue 151 of the pawl 15 and the central recess 161 of the spring stopper 16 to make the pawl flexibly movable within the sliding slots 111.

The holed plate 18 is fixed between the spring stopper 16 and the junction 116 and is formed with an inserting hole 181 coaxial with the lever hole 112. The inserting hole 181 is less than the lever hole 112 in diameter to prevent the lever 30 from reaching the spring stopper 16.

Figure 4:
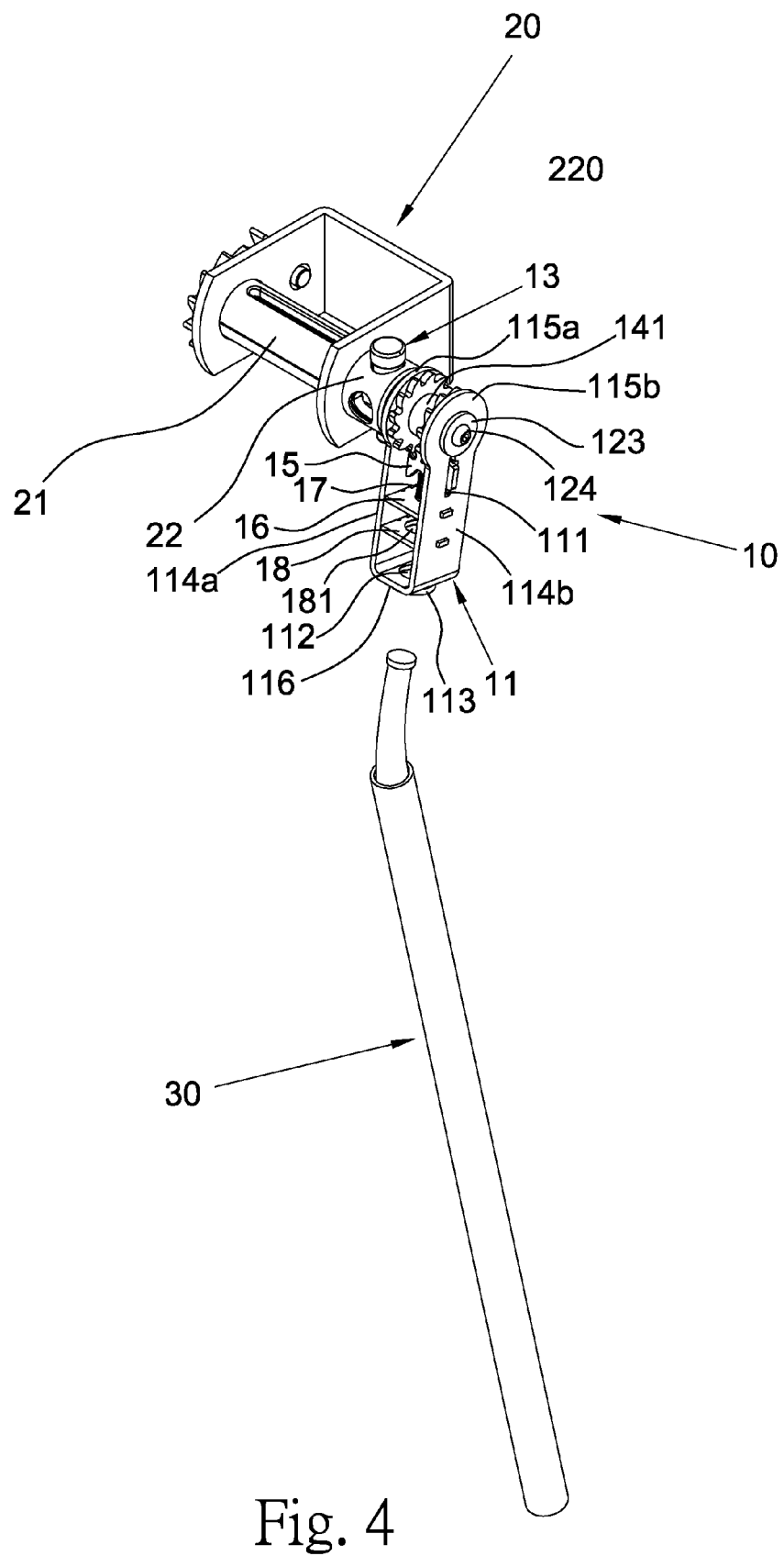
FIG. 4 is a schematic showing the invention is associated with a strap tensioner and a lever.

Please refer to FIG. 4. The ratchet adapter 10 can be mounted on the protrudent portion 22 of the winding shaft 21 by the ratchet shaft 12 and the bolt 13. Thus the winding shaft 21 can be synchronously rotated with the ratchet shaft 12. In other words, the invention may be associated with a conventional strap tensioner without using a new one.

Figure 5:
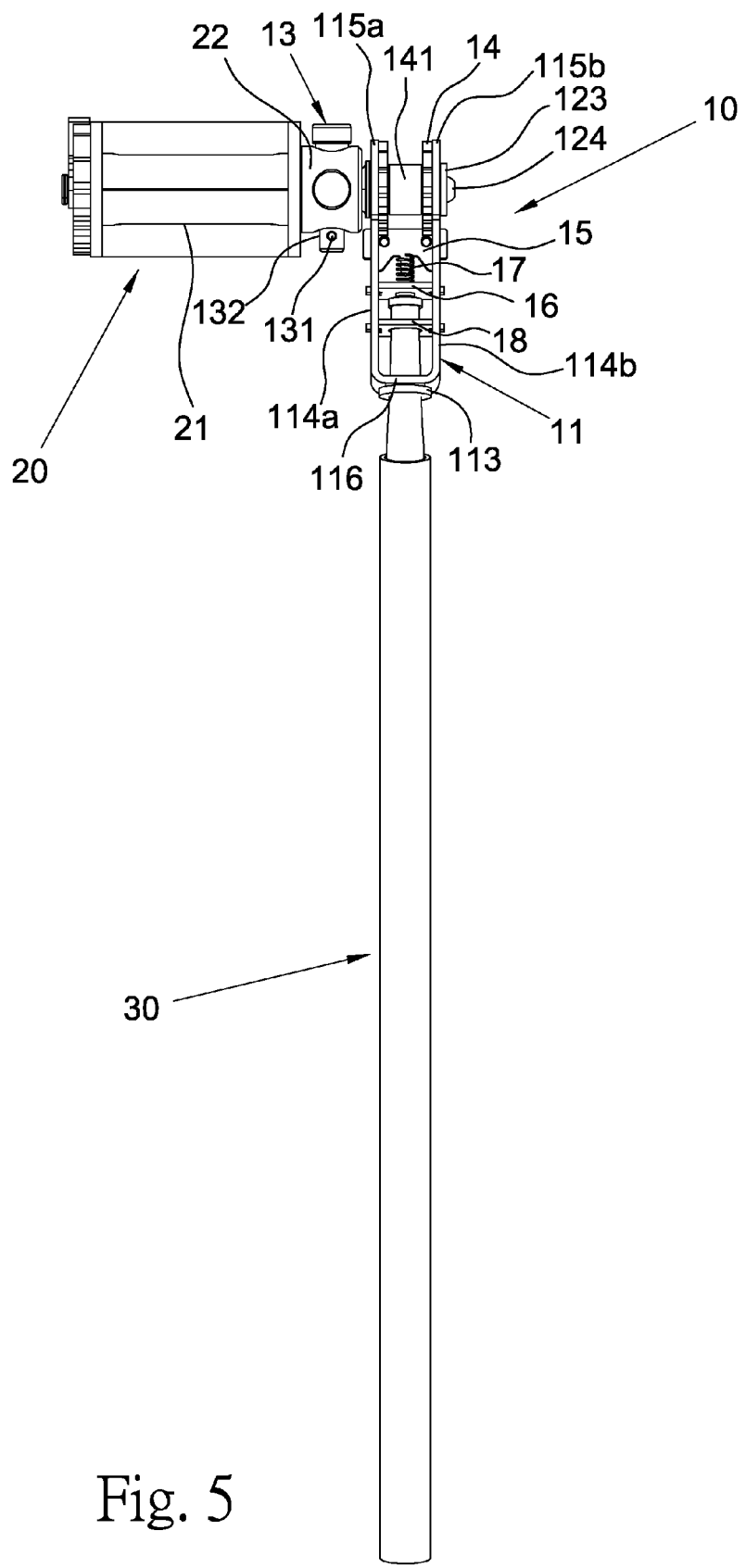
FIG. 5 is an assembled view of FIG. 4.
Figure 6:
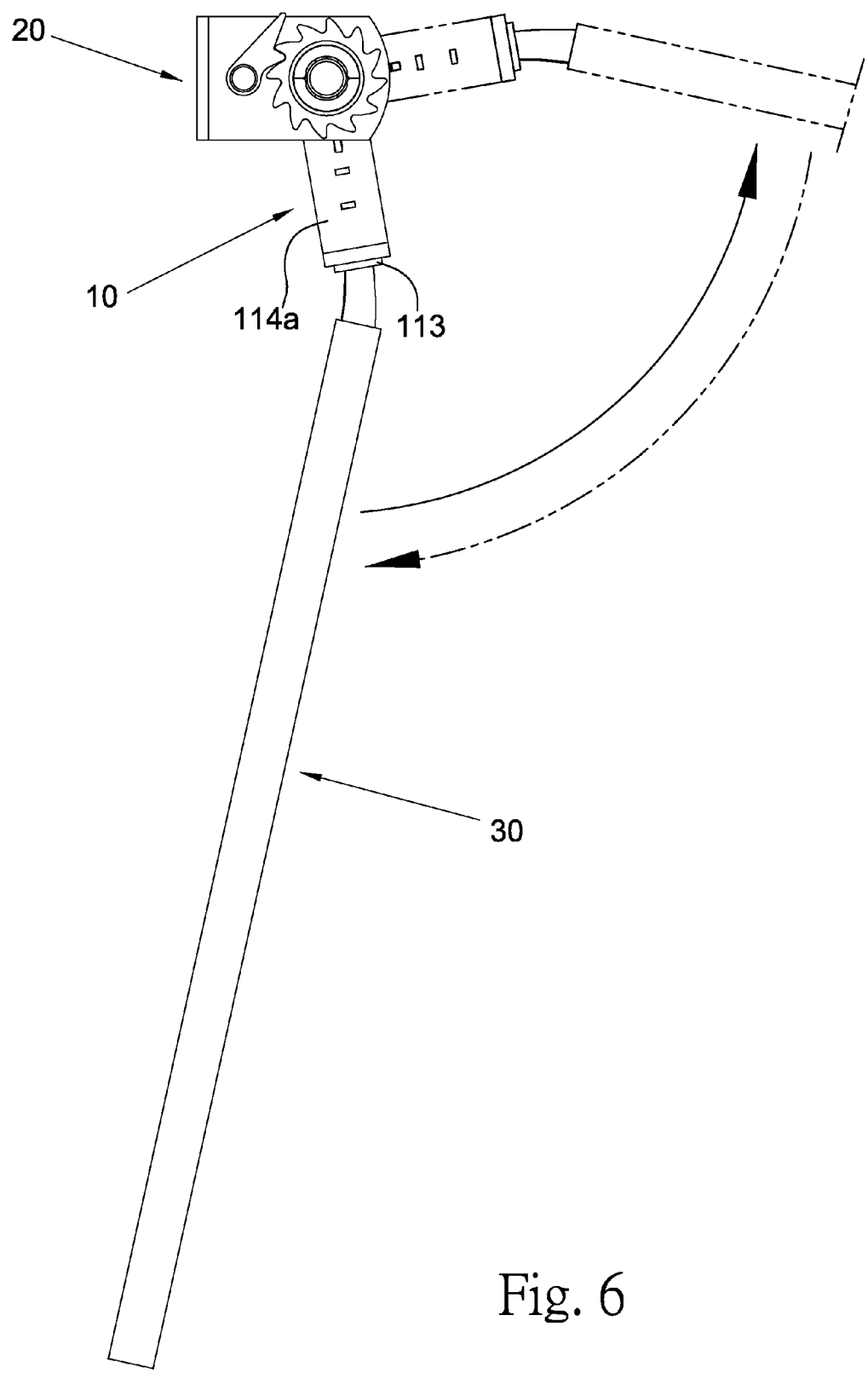
FIG. 6 is a schematic view of the invention in use.
Figure 7:
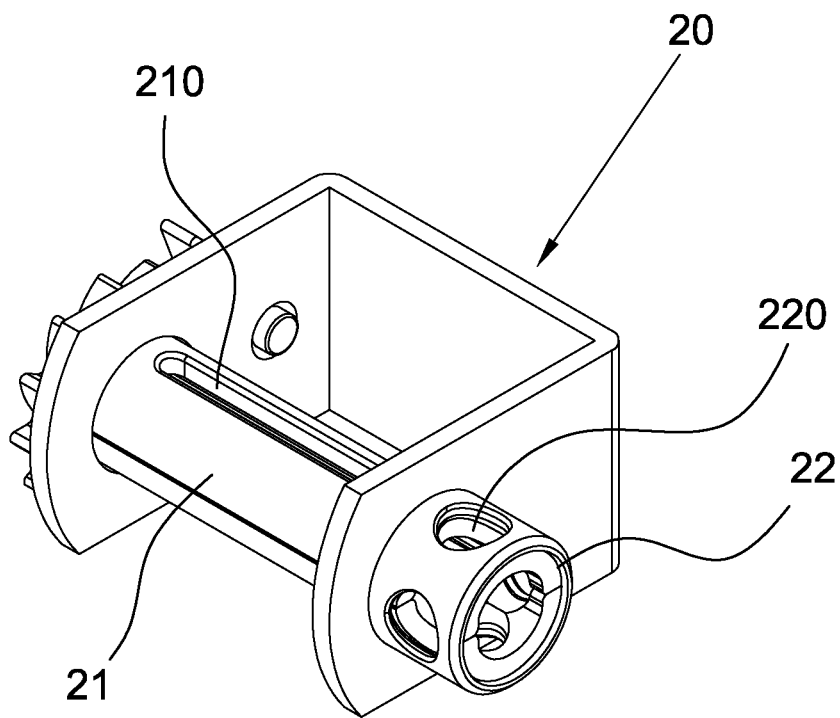
FIG. 7 shows a conventional strap tensioner.
Figure 8:
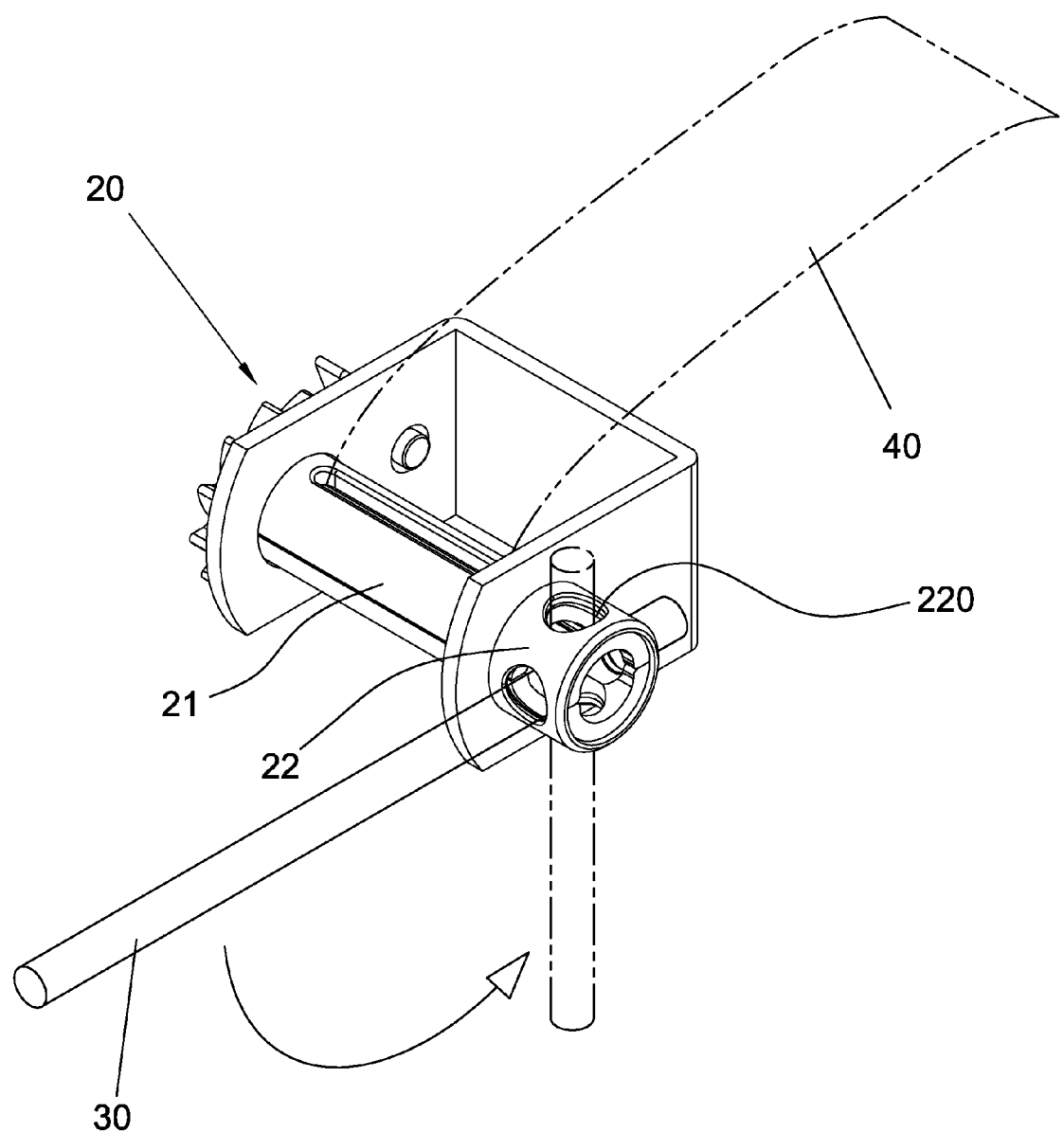
FIG. 8 shows the conventional strap tensioner of FIG. 7 in use.

Please refer to FIGS. 5-7. When the ratchet adapter 20 has associated with the strap tensioner 20, a user can insert the lever 30 into the lever hole 112 and the inserting hole 181 and then rotate the lever 30 to drive the winding shaft 21. As shown in FIG. 6, when the lever 30 is rotate upward or counterclockwise, the lever 30 can rotate the ratchet shaft 12 and the winding shaft 21 to tense the strap because the ratchets 14 will engage with the pawl 15; while when the lever 30 is rotate downward or clockwise, the lever 30 cannot rotate the ratchet shaft 12 because the ratchets 14 will press the pawl 15. As a result, the lever 30 can reciprocatingly unidirectionally drive the strap tensioner 20 by means of the invention without repeatedly drawing and inserting the lever 30.

It will be appreciated by persons skilled in the art that the above embodiment has been described by way of example only and not in any limitative sense, and that various alterations and modifications are possible without departure from the scope of the invention as defined by the appended claims.

What is claimed is:

1. A ratchet adapter for a strap fastener, comprising:
   a frame, being of a U-shaped body having a junction and two sides, each side having a free end, each free end being separately provided with a shaft hole, a sliding slot being separately formed near each of the respective shaft holes, and a lever hole being formed at the junction;
   a ratchet shaft, having an outer section with a radial hole and an inner section axially inserted in the shaft holes;
   a bolt, inserted into the radial hole;
   a ratchet, integratedly mounted around the ratchet shaft;
   a pawl, slidably disposed between the two sliding slots of the frame for engaging with the ratchet, and having a tongue toward the junction;
   a spring stopper, fixed between the two sides of the frame;
   a spring, compressively arranged between the tongue of the pawl and the spring stopper to make the pawl flexibly movable within the sliding slots; and
   a holed plate, fixed between the spring stopper and the junction, and having an inserting hole coaxial with the lever hole.

2. The ratchet adapter of claim 1, wherein an edge of the lever hole is formed with a reinforcement wall.

3. The ratchet adapter of claim 1, wherein the inner section is formed with two parallel planes, and an outer end of the inner section is axially disposed with a central threaded hole so that the ratchet shaft is fastened on one of the sides by screwing a screw into the central threaded hole.

4. The ratchet adapter of claim 1, wherein the bolt is formed with a bar having a first diameter and a head having a second diameter that is greater than the first diameter.

5. The ratchet adapter of claim 4, wherein the bar is disposed with a retractable ball.

6. The ratchet adapter of claim 1, wherein the ratchet is two in number, and the two ratchets are separately located outside the two sides of the frame, a sleeve is sandwiched between the two sides and the two ratchets, and each of the ratchets is formed with a central hole having a shape corresponding to the inner section of the ratchet shaft.

7. The ratchet adapter of claim 1, wherein the spring stopper is formed with a central recess toward the tongue, and one end of the spring is received in the central recess.

8. The ratchet adapter of claim 1, wherein the inserting hole is less than the lever hole in diameter.

* * * * *